United States Patent
Hacsi

(12) 
(10) Patent No.: US 7,387,093 B2
(45) Date of Patent: Jun. 17, 2008

(54) INTERNAL COMBUSTION ENGINE WITH SIDEWALL COMBUSTION CHAMBER AND METHOD

(76) Inventor: James Scott Hacsi, 13 Dartmouth Ave., Pueblo, CO (US) 81005

( * ) Notice: Subject to any disclaimer, the term of this patent is extended or adjusted under 35 U.S.C. 154(b) by 0 days.

(21) Appl. No.: 11/598,431

(22) Filed: Nov. 13, 2006

(65) Prior Publication Data

US 2007/0089694 A1    Apr. 26, 2007

Related U.S. Application Data

(60) Provisional application No. 60/848,594, filed on Oct. 2, 2006.

(51) Int. Cl.
*F01B 7/12* (2006.01)
*F02B 19/00* (2006.01)

(52) U.S. Cl. .................. 123/51 R; 123/253; 123/261

(58) Field of Classification Search ............... 123/48 R, 123/48 A, 48 AA, 51 R, 78 R, 78 A, 78 AA, 123/253, 261, 21, 46 R, 46 SC, 46 E
See application file for complete search history.

(56) References Cited

U.S. PATENT DOCUMENTS

| | | | |
|---|---|---|---|
| 3,170,406 A | * | 2/1965 | Robertson ................. 123/46 R |
| 6,094,915 A | | 8/2000 | Negre et al. |
| 6,397,579 B1 | | 6/2002 | Negre |
| 6,543,225 B2 | | 4/2003 | Scuderi |
| 6,609,371 B2 | | 8/2003 | Scuderi |
| 6,722,127 B2 | | 4/2004 | Scuderi |
| 6,880,502 B2 | | 4/2005 | Scuderi |
| 6,986,329 B2 | | 1/2006 | Scuderi et al. |
| 7,017,536 B2 | | 3/2006 | Scuderi |
| 7,021,270 B1 | | 4/2006 | Stanczyk |
| 7,121,236 B2 | | 10/2006 | Scuderi et al. |

* cited by examiner

*Primary Examiner*—Noah Kamen

(57) ABSTRACT

An internal-combustion, reciprocating-piston engine operating on the Otto cycle and associated method are provided where a sidewall combustion chamber is employed that is capable of receiving highly-compressed air or a mixture of any gas and fuel from a cylinder while a main piston is positioned at or near top-dead-center in the cylinder, and where the sidewall combustion chamber is also capable of temporarily storing a highly-compressed air or a mixture of any gas and fuel before sending and re-injecting an ignited or burning mixture of highly-compressed air or a mixture of any gas and fuel into the same cylinder between the main piston and the displacer-piston when the main piston is located in the cylinder at an optimum position for receiving and transferring energy or forces.

9 Claims, 3 Drawing Sheets

INTERNAL COMBUSTION ENGINE WITH SIDEWALL COMBUSTION CHAMBER AND METHOD

CROSS-REFERENCE TO RELATED APPLICATIONS

Figure 1:
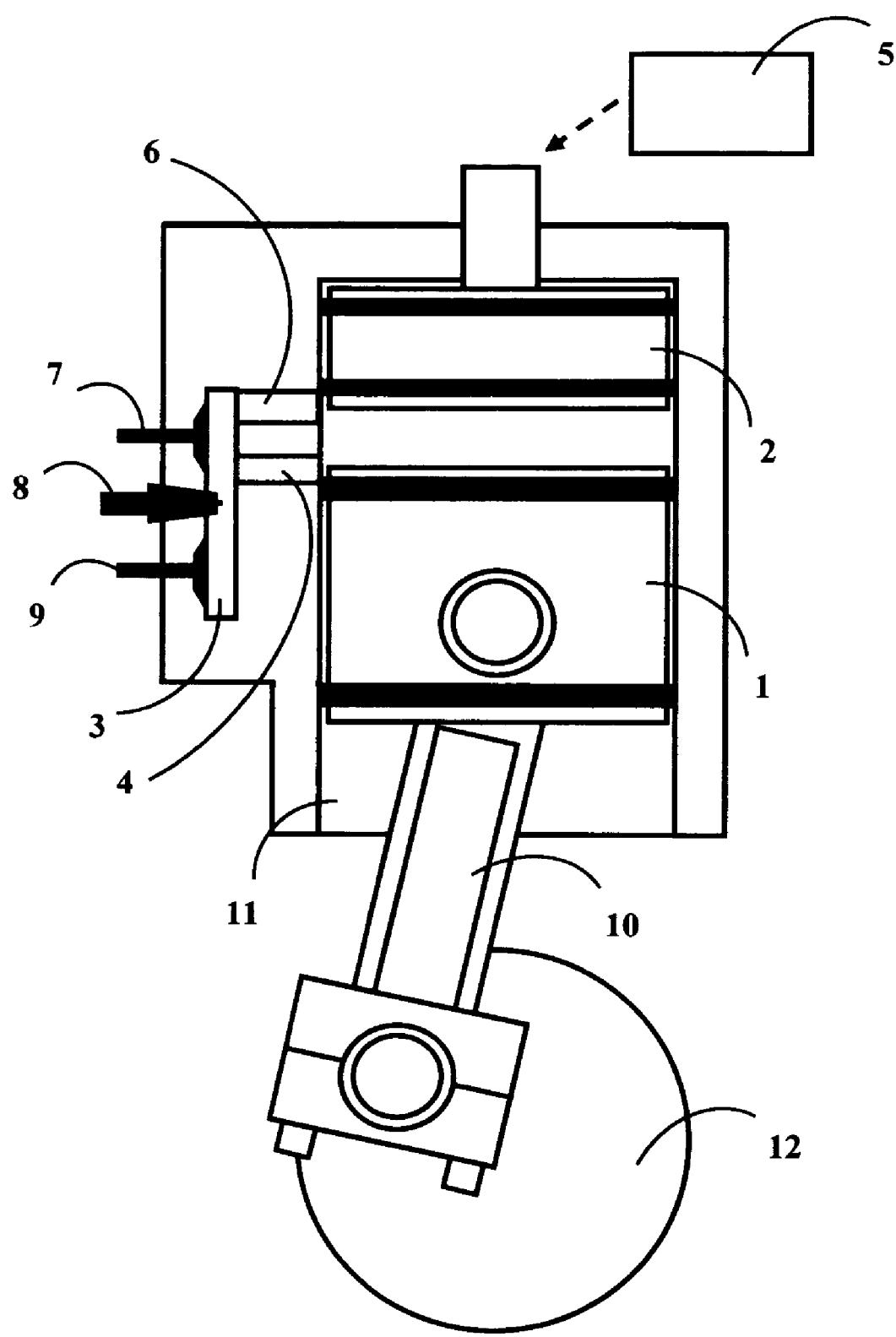
Figure 2:
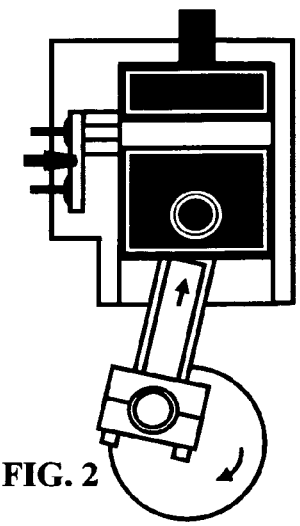

This application claims the benefit of PPA Ser. No. 60/848,594 filed Oct. 02, 2006

STATEMENT REGARDING FEDERALLY SPONSORED RESEARCH

Not applicable

SEQUENCE LISTING OR PROGRAM

Not applicable

BACKGROUND OF THE INVENTION

1. Field of the Invention

This invention relates to internal-combustion, reciprocating-piston engines and combustion processes used therein and more specifically, this invention relates to internal-combustion, reciprocating-piston engines which use a sidewall combustion chamber and a displacer-piston for improving output power and efficiency.

2. Description of Prior Art

Combustion normally occurs in common reciprocating-piston, internal combustion engines when the piston reaches the highest point in the cylinder in order to take advantage of maximum compression of the fuel/air mixture at the time of ignition. At that point, however, the piston's connecting rod is nearly vertically aligned with the cylinder and very little of the large force acting downward on the piston crown immediately after ignition actually works to rotate the crankshaft. Most of the tremendous force from the burning fuel-air mixture is momentarily acting in a manner that places a heavy burden on the crankshaft and its bearings. More specifically, a force equal to the cosine of the crankshaft's rotational angle after top-dead-center multiplied by the force acting downward on the piston does little to rotate the crankshaft, but instead acts to drive the crankshaft out of the engine. A relatively small force equal to the sine of the crankshaft's rotational angle after top-dead-center multiplied by the force acting downward on the piston actually works tangentially to rotate the crankshaft immediately after ignition of the fuel-air mixture. Ignition of the fuel-air mixture at top-dead-center in any reciprocating-piston, internal-combustion engine seems to be an inherent disadvantage of such engines that results in relatively low output power and efficiency.

Negre discloses in U.S. Pat. No. 6,094,915 (Negre, et al., 2000) what would commonly be considered a split-cycle internal combustion automobile engine where the compression, combustion, and expansion phases of the engine-cycle are done in three separate portions of the engine. Compressed air, supplied by either an external source or a compressor in another location of the vehicle, is mixed with fuel and then fed to a combustion chamber where the fuel/air mixture is ignited. The ignited mixture is then fed into an expansion chamber existing between a main piston and a second piston that follows the main piston down the expansion cylinder, in order to provide a minimum volume to produce "an optimum expansion mean tangential force" to the main piston. Negre failed to disclose, however, a method of using a single piston moving in a cylinder to compress air or another gas needed for the combustion process, and then subsequently using the same piston in the same cylinder for the expansion or power phase of the engine-cycle. More critically, Negre failed to disclose, and surely did not contemplate, a method to allow a piston in a cylinder to compress air to be used for the combustion process and then supply the ignited high-pressure mixture of fuel and gases back to the same cylinder, but directly into an expansion chamber formed between the same piston in the same cylinder, and a second piston that follows the first piston down the cylinder, in order to provide a minimum volume to produce "an optimum expansion mean tangential force" to the main piston. Such a method would obviously require fewer parts and would be much simpler in design. On the contrary, Negre would instead have the compression of the air or another gas done by either an entire separate air-compressor in the vehicle or by an air-compressor at a "filling" station.

There is a need then, for a method of using the same piston and cylinder combination for both compression and expansion phases which would then reduce the number of engine components to complete the same processes as accomplished by the Negre engine. A reduced number of engine components would in turn reduce the complexity, weight, and cost of building the engine. When used in an automobile, reduced engine weight means less fuel is required and less energy is needed to move the vehicle down the road which means less pollution of the environment occurs since less fuel is needed to power the automobile. Negre failed to anticipate or expect such results even though the intent of that invention is to reduce pollution and save fuel! So, Negre failed to disclose an engine that is not of the separate-cylinder, split-cycle type where a piston moves in a cylinder compressing a volume of air or another gas for use in the combustion process and where the ignited mixture is used to drive the same piston in the same cylinder during the expansion or power phase of the engine-cycle. Methods such as the one just described and which was previously-unanticipated, yet more-promising, are contrary to the commonly-held and seemingly growing belief that a complicated engine of the separate-cylinder, split-cycle type is required to accomplish the task of delaying ignition or prolonging the combustion process (or "burn") until the crankshaft is in a better position to receive the energy released from the combustion of a fuel and air mixture. Split-cycle engines using separate or multiple cylinders for different engine-phases have been in existence for a very long time and have not proven feasible on a commercial basis for one reason or another. Moreover, it will be shown that such a belief and requirement is simply not substantiated in real practice because simpler engines with fewer parts can be built to accomplish the same objectives. A much simpler and effective internal combustion reciprocating-piston engine is therefore needed that operates on the Otto cycle and is an improvement over the Negre engine which can delay ignition and the combustion process until the piston, crankshaft, and connecting-rod are in an optimum position at or past top-dead-center to receive energy or forces. More specifically, an engine and method are needed where compressed air, or a mixture of compressed air and fuel, is taken from a cylinder while a piston is at top-dead-center in the cylinder for achieving maximum compression, then after igniting the fuel and air mixture, subsequently re-introducing the burning fuel/air mixture into the same cylinder at a more optimum time and location within the cylinder for driving the piston in the cylinder more efficiently and with greater output power.

The concept described and disclosed in the Negre engine where a secondary piston follows or accompanies a main piston over part of its downward or power stroke in order to provide a minimum volume to produce "an optimum expansion mean tangential force" to the main piston is not a new concept since it has been successfully marketed and used by a major engine manufacturer for many years. An article from "Diesel-Electric Locomotive" (Foell and Thompson, 1946) describes the process as used in the Fairbanks-Morse 38D8 two-stroke opposed-piston engine as follows: "The underlying principle of the two-stroke cycle opposed-piston Diesel is the use of a plain open-ended cylinder in which combustion takes place in the center of its length between two pistons which move away from each other. The pistons are utilized to uncover the exhaust and air-inlet ports, thus eliminating the use of valves. The pistons controlling the air-inlet ports are connected to the upper crankshaft, while those controlling the exhaust ports are connected to the lower crankshaft. The two shafts are mechanically connected by a vertical shaft and bevel gears, with the lower shaft (exhaust end) being set 12 degrees ahead of the upper shaft (inlet end) . . . . It is also obvious that when the upper piston is at inner dead center, the lower one has completed 12 degrees of its power stroke. This causes the lower piston to receive the greater part of the expansion work, at full engine load, with the result that about 72 percent of the total power is delivered by the lower crankshaft. The remaining power is delivered to the upper crankshaft where it is partially absorbed in driving the blower, leaving only a relatively small amount of power to be transmitted through the vertical gear drive to the lower crankshaft, which is connected to the driven machine . . . The 12 degrees by which the exhaust piston "leads" the intake piston permits a more advantageous port timing, and also allows for a limited amount of "ram" effect which further contributes to the operating economy." As complicated as the Fairbanks-Morse engine is—with two separate crankshafts—the process used in that engine to delay combustion until one piston and its crankshaft are in a more optimum position to receive energy and forces has proven over the years to be quite feasible. But again, the Fairbanks Morse engine is complicated and requires a large number of expensive, heavy parts. The Negre engine, however, would need an entire separate air-compressor or filling-station to accomplish the same task! Again, an engine comprised of fewer parts and with less complexity than either the Fairbanks-Morse 38D8 engine or the Negre engine is needed for increasing effectiveness and efficiency.

Scuderi first discloses in U.S. Pat. No. 6,543,225 (Scuderi, 2003) a gas passage in a split-cycle engine that exists between a first cylinder and a second cylinder where the first piston in the first cylinder is used to compress air or another gas while the combustion process and expansion of the ignited fuel/air mixture is accomplished in the second cylinder by the moving second piston. This process allows extra compressed air to be introduced into the second cylinder in order to prolong the "burn" until the second piston and the common crankshaft are in positions at or after top-dead-center to receive energy (or forces) in a better manner. In a second U.S. Pat. No. 6,397,579 (Negre, 2002), Negre discloses a split-cycle engine (herein referred to as the second Negre engine) that has a separate, independent combustion chamber located between a first cylinder used for compressing air (or another gas) and a second cylinder used for gas-expansion or the power-stroke. The process in the second Negre engine is similar to the process in the Scuderi engine since both seem to accomplish the same task of prolonging the "burn" with additional injected compressed-air from the first cylinder so the expansion piston and common crankshaft are in more optimum positions to receive energy. It's important to notice, however, that both the gas passage in the Scuderi engine and the separate, independent combustion chamber in the second Negre engine receive compressed air, or another gas, from one cylinder and re-inject the ignited fuel/air mixture into a second and entirely different cylinder for use in the expansion and the power-stroke phases of the engine-cycle. A separate, independent combustion chamber as presented in both Negre engines can also receive compressed-air or another gas from a separate air-compressor or storage tank located somewhere in the vehicle before the burning fuel/air mixture is later introduced into an entirely separate expansion chamber. There is currently no engine design in use today, however, with a separate, independent combustion chamber that receives air or gas from one cylinder and re-injects a burning, ignited fuel/air mixture back into the same cylinder from where it was originally taken.

A very serious problem and disadvantage with both Negre engines and the Scuderi engine will become more obvious and apparent once those engines are eventually built and tested or if they're ever used on a wide scale. The gas-expansion and power-stroke cylinders in those engines apparently are never cooled by fresh-air from an intake-valve which means an external source of cool air will be required for cooling purposes, or else special materials will be needed for operating in extremely high heat-stress conditions. Such an inherent and detrimental design-flaw will undoubtedly increase the cost of producing the Negre and Scuderi engines and will decrease both the performance and efficiency of those engines. This brings up operability and effectiveness questions regarding separate-cylinder, split-cycle type engines in general, since every design currently available for inspection seems to include the same cooling problem.

There is no engine or method available for use today that contains a separate gas passage or separate, independent combustion chamber that receives compressed air, or another gas, from one cylinder and re-injects the ignited fuel/air mixture at a much higher pressure into the exact same cylinder, except at a different location from where the compressed gas was originally taken from. Furthermore, there is certainly no engine or method currently available, of the split-cycle type or otherwise, with a separate combustion chamber that receives compressed air from one location in a cylinder and then subsequently re-introduces high-pressure combustion gases back into the same cylinder directly into an expansion chamber formed between a main piston in the cylinder and a second piston which follows the main piston part-way "down" the same cylinder in order to minimize volume and enhance the expansion process for maximizing output power and overall efficiency.

BACKGROUND OF THE INVENTION—OBJECTS AND ADVANTAGES

It would therefore be beneficial to provide an internal-combustion, reciprocating-piston engine and associated method, where ignition of the compressed fuel/air mixture is delayed until the crankshaft is at a better rotational angle after top-dead-center for receiving the largest percentage of the force possible that is present on the piston immediately following combustion of the fuel/air mixture. It would also be of benefit to maintain the volume of maximum compression in the cylinder, even as the piston moves downward in the cylinder in order to maximize the effects of the ignited and burning fuel-air mixture when combustion is delayed a sufficient amount of time after top-dead-center. It would therefore be of much benefit to have a simpler, lighter, and cheaper-to-build engine with fewer parts that is not of the separate-cylinder, split-cycle type of Scuderi and Negre, and which uses entirely new concepts and devices in combination with proven concepts for improving the efficiency and effectiveness of an internal combustion reciprocating-piston engine operating on the Otto cycle.

It would also be beneficial to have an engine with a separate, independent combustion chamber, called a "sidewall combustion chamber", that receives highly-compressed air, or a mixture of fuel and air, from one location in a cylinder, and then subsequently re-introduces the ignited fuel and air mixture back into the same cylinder at a better location where an expansion chamber is formed between a first piston in the cylinder and a second piston, called a displacer-piston, which moves in the same cylinder and which follows or accompanies the first piston for a distance as it moves in the cylinder for the purpose of minimizing volume in the expansion chamber.

Thus, the present invention incorporates entirely new concepts and devices for improving the performance and reducing the number of components of the industry-proven Fairbanks-Morse 38D8 opposed-piston engine, as well as the Negre and Scuderi engines to provide a novel, highly-effective and very efficient engine and method.

A major, previously-unexpected advantage of using a sidewall combustion chamber in the present invention is that both the intake and exhaust valves will be placed inside the combustion chamber. That way, fresh, cool air will be drawn into and through the single cylinder that is used for all phases of engine operation, including the power-stroke, during each and every cycle of operation. This eliminates the serious cooling problem inherent in the Negre and Scuderi engines and as a result, engines can be built with fewer parts made of cheaper, readily-available materials.

The sidewall combustion chamber will contain a minimum volume or space, so it will be extended down along and substantially abutting the outside wall of the single cylinder in order to provide sufficient inside-surface area for an intake valve, an exhaust valve, and a sparkplug (if used). There will be one opening from the sidewall combustion chamber into the single cylinder at a position where the piston, slidably moving in the cylinder, can compress air (or a mixture of any gas and fuel) to a very high degree. Another opening will be provided between the sidewall combustion chamber and another location in the wall of the single cylinder so ignited fuel/air can be injected into the cylinder at an optimum time. Designing the sidewall combustion chamber in this manner will not only allow cool air from the intake valve to flow through the combustion chamber, but it will also allow the compressed air (or any gas and fuel) to completely fill the combustion chamber before ignition. That would mean the fuel/air mixture can move to, and reach, a position inside the sidewall combustion chamber that corresponds to a position relatively far down in the cylinder before ignition occurs. Fuels, such as hydrogen with a relatively slow flame-speed, can then be used in the engine because the hydrogen will be able to move to a position "down" the cylinder ahead of the moving piston before the ignited fuel/air mixture is re-introduced into the cylinder.

The Scuderi engine and both Negre engines, and any other split-cycle engine for that matter, seem to use an unreasonable number of valves in critical areas of operation. Moreover, the valves used in those engines must also operate when subjected to severe heat and mechanical stress conditions. As the reader will see, the engine known as the present invention utilizes the sides/skirts of pistons moving in the cylinder to act as valves in opening or closing cylinder ports thus eliminating the need for an excessive number of valves. Again, the engine known as the present invention has the distinct advantage over other engines of eliminating extra parts that can fail prematurely under unreasonable operating conditions, which obviously makes this engine more reliable by requiring fewer parts to do the same tasks.

Finally, it would be very advantageous to provide a simple, cheap-to-build engine that can also be used as an air-compressor to capture braking energy when an automobile is slowed or stopped, and then re-use the captured braking energy in the same cylinder and with the same pistons and components to provide acceleration to the automobile. When used for regenerative braking, the engine and method known as the present invention can perform the task much better and with fewer parts than either the Scuderi engine or the Negre engines since fewer parts implies greater efficiency and effectiveness.

Accordingly, besides the objects and advantages of the internal combustion engine and associated method as indicated herein, several specific objects of the present invention are:

(a) to provide internal-combustion, reciprocating-piston engines capable of operating with an efficiency that approaches their theoretical Carnot efficiency;

(b) to provide internal-combustion, reciprocating-piston engines that are more powerful;

(c) to provide powerful and efficient internal-combustion, reciprocating-piston engines that are lightweight and inexpensive to build;

(d) to provide internal-combustion, reciprocating-piston engines with a higher Carnot efficiency;

(e) to provide engines that are less complex with fewer parts and cheaper materials:

(f) to provide internal-combustion, reciprocating-piston engines for automotive, truck, and heavy equipment uses requiring either increased power or an increase in the miles driven per gallon or hours used per pound of fuel, or both;

(g) to provide an efficient and effective engine whose cylinders and pistons act to compress air during vehicle braking and then subsequently use the same cylinder and components to act as an expansion chamber to convert captured braking energy in the from of compressed-air into useful work.

SUMMARY

In accordance with the present invention, a novel internal-combustion, reciprocating-piston engine is presented that employs a combination of entirely new and beneficial concepts with older, proven concepts for the purpose of increasing the effectiveness and efficiency of internal combustion engines. Engines are contemplated that have fewer parts and are thus less complex, lighter in weight, cheaper-to-build, more reliable, and much more effective in reducing air pollution and decreasing fuel consumption by an automobile. Use of a sidewall combustion chamber, which is extended down along the outside-wall of the cylinder for minimizing volume and also containing the intake valve, the exhaust valve, and possibly a sparkplug, allows the engine to be kept cool during operation. The sidewall combustion chamber also gives the engine a previously unanticipated ability to receive air, or a mixture of fuel and air, from a cylinder at one location and re-inject a high-pressure mixture of burning fuel and air after ignition into the same cylinder at a more optimum location. The ability to efficiently use hydrogen as a fuel gives the engine known as the present invention an unprecedented advantage over any other engine in use today for allowing our country to move to a "hydrogen economy". A displacer-piston is used in the present invention to minimize volume in the cylinder during the combustion process while the main piston moves substantially into its power-stroke as was previously done in the proven Fairbanks-Morse engines of the past.

DRAWINGS—FIGURES

Figure 11:
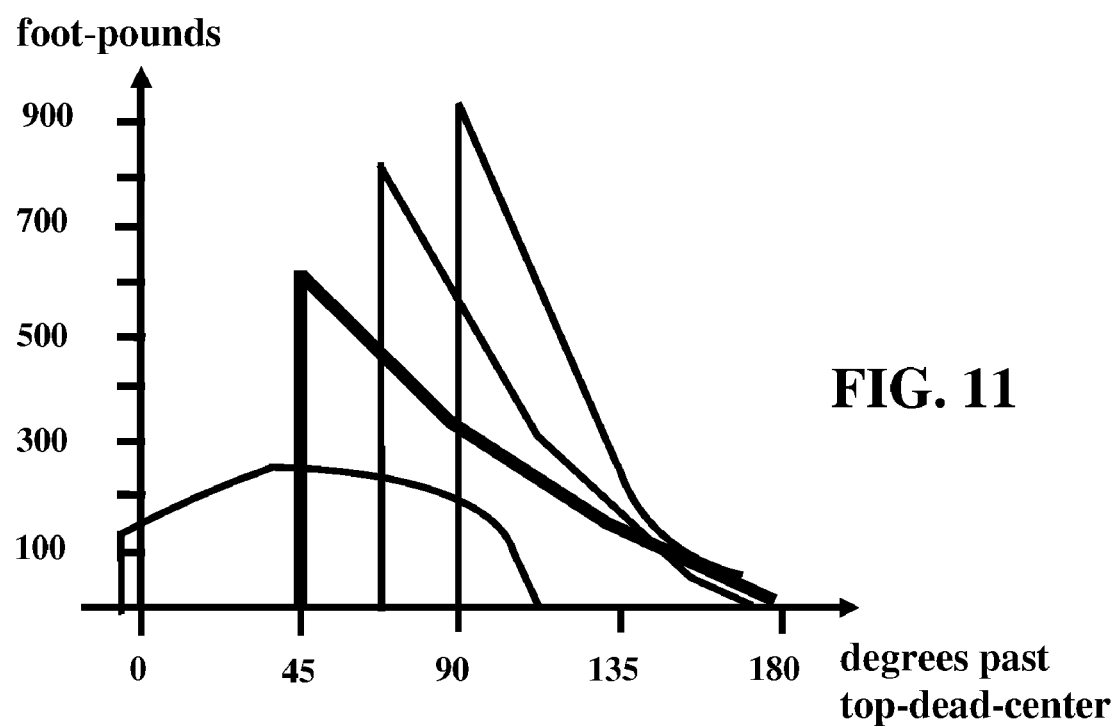

In the drawings, FIG. 1 shows a detailed section of the engine which is known as the preferred embodiment of the present invention and specific identified components of the engine during a portion of the operating cycle known as the compression-stroke. FIG. 2 through FIG. 10 taken together depicts the sequence of engine phases or parts of the four-stroke Otto cycle in which the engine operates. FIG. 11 shows various torque-curves for firing a designated number of degrees past top-dead-center for comparison of areas under each torque-curve.

DRAWINGS—REFERENCE NUMERALS 1 main piston 2 displacer-piston 3 sidewall combustion chamber 4 bottom cylinder port 5 displacer-piston actuating means 6 top cylinder port 7 exhaust valve 8 sparkplug or glow plug 9 intake valve 10 connecting rod 11 engine cylinder 12 crankshaft

DETAILED DESCRIPTION—PREFERRED EMBODIMENT

A detailed section of a preferred embodiment of the engine known as the present invention is shown in FIG. 1 with engine parts labeled for identification. A main piston 1 is contained in a cylinder 11 and is free to move within the cylinder while rings or seals on the outside diameter of the main piston 1 prevent gas leakage around the main piston 1. Also, in the same cylinder 11 and sharing the cylinder's volume is a displacer-piston 2 which is also free to move within the cylinder 11 and is sealed along its outside diameter with seals or rings to prevent gas leakage. The displacer-piston 2 which is driven by an actuating means 5 to allow it to slide up and down the cylinder and accompany the main piston 1 in its travel, occupies the top volume of the cylinder 11, where the "top" of the cylinder 11 implies the volume or space in the cylinder 11 closest to the cylinder's head and farthest away from the "bottom" of the cylinder 11, which is where the main piston 1 enters the cylinder 11. When the main piston 1 or the displacer-piston 2 move "upward" in this description it means moving toward the cylinder's head, and when the two components are said to move "downward" it implies moving away from the cylinder's head or in a direction toward the opening where the connecting rod 10 of the main piston 1 enters the cylinder 11. A side-wall combustion chamber 3, which is essentially a space with a specific volume that temporarily holds or stores the fuel-air mixture whether the mixture is either ignited or not. A top cylinder port 6 connects the sidewall combustion chamber 3 with the cylinder 11 through an opening in the top portion of the cylinder's wall. A bottom cylinder port 4 also connects the sidewall combustion chamber 3 with the cylinder's wall at a point in the wall that determines where the hot gases from combustion will be re-introduced into the cylinder 11 from the sidewall combustion chamber 3. It should be emphasized and pointed out that the cylinder-ports have been exaggerated in length for the purpose of clarify in this description. The ports will actually consist of openings that enter directly into the cylinder 11 to and from the closely-located sidewall combustion chamber 3, and the ports will only be as long or as thick as the wall of the cylinder 11 in order to reduce overall volume when the main piston 1 is at top-dead-center. Gas flow through the bottom cylinder port 4 from the sidewall combustion chamber 3 to the cylinder 11 can only occur when the opening of the bottom cylinder port 4 into the cylinder 11 is not covered by the main piston 1. In words, the main piston covers or uncovers the opening of the bottom cylinder port 4 as it moves and thus the main piston 1 controls gas flow through the bottom cylinder port 4 where the side surface of the main piston acts to block the entry of the bottom cylinder port 4 into the cylinder 11. An exhaust valve 7 and an intake valve 9 are shown in the sidewall combustion chamber 3, but this arrangement will most likely only be included in an engine of this type operating on a four-stroke cycle. In other words, an engine of this type operating on a two-stroke cycle will have a different arrangement of valves. There will obviously be actuating means for each valve for opening and closing them at the appropriate times which are not shown. A sparkplug 8 is provided to ignite the fuel-mixture in the sidewall combustion chamber at the appropriate time. The connecting rod 10 acts to rotate a crankshaft 12 for providing work to propel the automobile and drive accessories.

OPERATION

Figure 3:
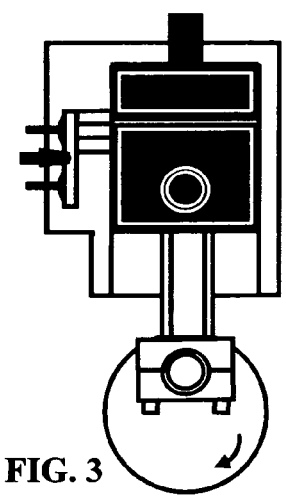
Figure 4:
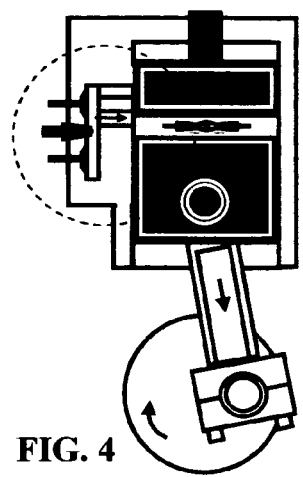
Figure 5:
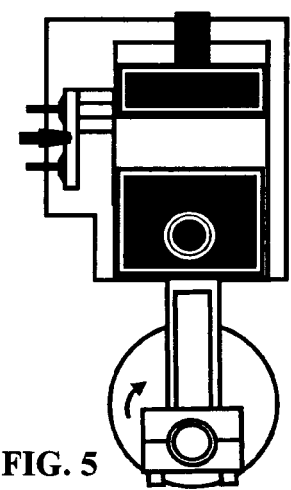
Figure 6:
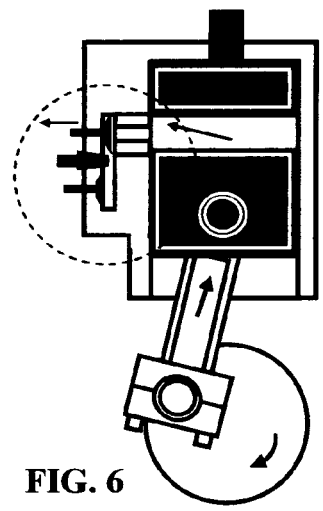
Figure 7:
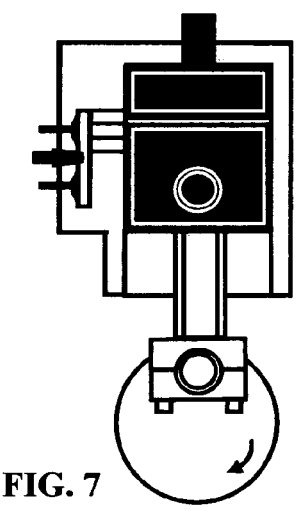
Figure 8:
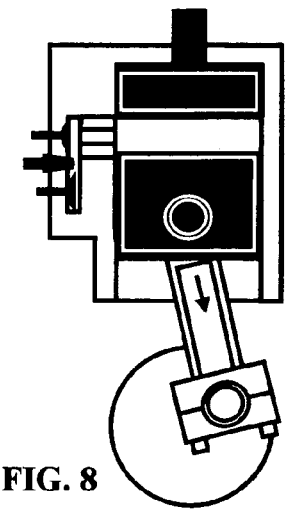
Figure 9:
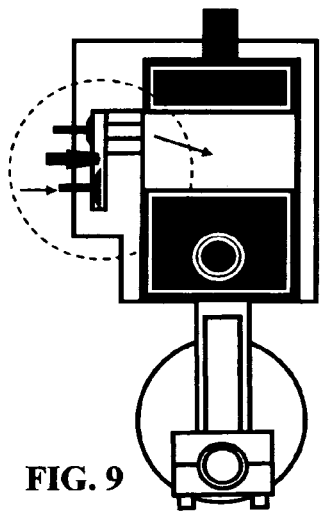
Figure 10:
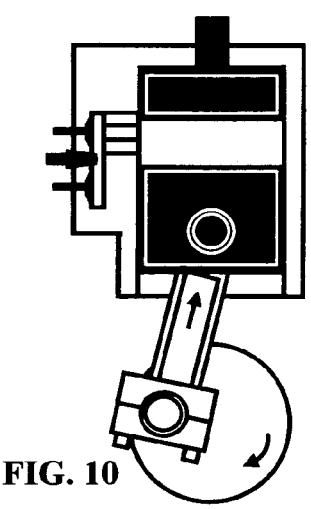

FIG. 2 through FIG. 10 will be used to describe a four-stroke cycle of the engine known as the preferred embodiment of the present invention. The sequence of the four-stroke Otto cycle is picked up and continued in FIG. 2 as the main piston moves upward in the cylinder compressing fuel/air into the sidewall combustion chamber during the compression stroke. Both the intake valve and the exhaust valve are closed, the sparkplug is not "firing", and the displacer-piston is at the top of the cylinder and out of the way. Blockage of the bottom cylinder port is accomplished by the side/skirt of the main piston, so the fuel/air must be compressed into the sidewall combustion chamber after that point only through the top cylinder port. FIG. 3 shows the main piston at top-dead-center with a full charge of highly compressed fuel/air (gasoline/air in this case at 100 psi-150 psi) in the sidewall combustion chamber. No ignition or combustion of the fuel/air mixture is done at this time. Notice that the fuel/air mixture has filled the sidewall combustion chamber and has already moved to a position corresponding to a location relatively far down in the cylinder. Now, as the main piston passes top-dead-center and begins to move downward in the cylinder, the displacer-piston accompanies it downward in the cylinder. At that point, the side of the displacer-piston covers or blocks the top cylinder port trapping the highly compressed fuel/air mixture inside the sidewall combustion chamber. The displacer-piston and main piston travel in unison together down the cylinder until the displacer-piston reaches a position located just above the still-blocked bottom cylinder port where it stops and is rigidly locked into position. Notice the main piston is already a substantial distance into its power-stroke and ignition has still not occurred. In FIG. 4, the displacer-piston is still locked into position above the bottom cylinder port while the main piston has continued downward in its travel and unblocking or opening the bottom cylinder port. At that point, or just before, the sparkplug fires and ignites the fuel/air mixture. High pressure combustion gases (450 psi-500 psi) exit the sidewall combustion chamber into the cylinder through the opened bottom cylinder port into the gap between the stationary displacer-piston and the moving main-piston. A tremendous force is applied to the top of the main piston propelling it downward in the cylinder at a high rate of speed. Notice the crankshaft has rotated a large number of degrees past topdead-center when ignition occurs, so a large portion of the force acting on the main piston actually rotates the crankshaft increasing the amount of useful work done to eventually drive the wheels. The same combustion process that normally occurs at top-dead-center in a standard engine has been moved down the cylinder where it is much more efficient and effective! FIG. 5 shows the main piston at bottom-dead-center in the cylinder and just turning the "corner". The displacer-piston at this time returns to the top of the cylinder and is taken out of the way before the exhaust stroke begins and the power-stroke ends. In FIG. 6 the burnt fuel/air mixture is exhausted through the opened exhaust valve while the displacer-piston is out of the way so gases can pass through both opened ports. FIG. 7 shows the main piston again at top-dead-center. All the burnt gases are pushed out the exhaust valve and cylinder volume is minimized. FIG. 8 shows the main piston moving down the cylinder with the displacer-piston still at the top of the cylinder and out of the way. Fresh fuel and air are drawn into the cylinder through the opened intake valve. Notice cool, fresh air (and most likely fuel) is drawn through the sidewall combustion chamber and into the cylinder. This process allows for cooling of the combustion chamber and cylinder each cycle which is a major benefit over the Scuderi and Negre engines as well as split-cycle engines in general. In FIG. 9 the intake valve is closed and the main piston again reaches bottom-dead-center and turns the corner to begin compressing the fuel/air mixture. This is the beginning of the compression-stroke, which is continued in FIG. 10 as the main piston moves upward in the cylinder. At that point, the cycle begins to repeat many times.

Location of the bottom port in the cylinder determines the firing angle past top-dead-center of the engine known as the preferred embodiment of the present invention. In FIG. 13, various torque-curves are depicted and superimposed onto the same scales or axes for the purposes of comparison. The area under each curve is the total work done to rotate the crankshaft for each designated firing angle. Consider the following analysis by Carl Johnson, a physicist, in an internet article entitled 'Physics In An Automotive Engine': "Since the piston is 4" in diameter, the top surface of it is just PI*(4/2)$^2$ or around 12.6 square inches. Each of those square inches experiences the 500 PSI pressure, so the total force then instantaneously applied to the top of the piston is 12.6*500 or around 6300 pounds. Because of the geometry of the situation when the crankshaft has progressed 10° after TDC, the force diagram indicates that this downward force must be multiplied by (approximately) the sine of 10°, in order to determine the tangential force applied to the crankshaft. Approximately, because the connecting rod is no longer parallel with the axis of the cylinder bore, the actual angle being slightly higher, and an exact angle is easy to calculate with a thorough analysis. For now, 10° will give an approximate result for our purposes. Therefore, the tangential (rotative) force actually transferred to the crankshaft is around 6300*sin(10) or 6300*0.174 or around 1100 pounds. Since this force is applied to the throw of the crankshaft, at 1.75" radius from the centerline of the crankshaft, the torque transferred to the crankshaft is therefore 1100*1.75" or 1100*0.146 foot or 160 foot-pounds of torque. This calculation is in ball-park agreement with the published maximum torque curves for such engines, at 1500 rpm. Notice that the radial force applied to the crankshaft (bearings) is around 6300*cos(10) or around 6200 pounds! At that moment, the vast majority of the power of the explosion is trying to drive the crankshaft down out of the engine, without rotating it! And in seriously trying to abuse the bearings! Without engine oil, under pressure, in the bearings, they do not last long with 6200 pounds force against them . . . From a beginning pressure of 500 PSI in our example, at the later instant when the crankshaft had rotated 45° the volume has increased such that the pressure drops to around 200 PSI (without any leakage) and by the time the crankshaft has advanced 90° the pressure is down to around 125 PSI. The average pressure during this 90° of rotation is referred to as Mean Effective Pressure (mep) and is commonly around 200 for common engines under power. (This description is for best conditions, fairly high power and revs) ." Now, if the full 500 PSI present in the cylinder immediately after ignition can be applied to the piston when the crankshaft has rotated to 90° past TDC as is possible in the engine known as the present invention, then it would mean the tangential (rotative) force actually transferred to the crankshaft is around 6300*sin(90) or 6300*1 or 6300 pounds. Since this force is applied to the throw of the crankshaft, at 1.75" radius from the centerline of the crankshaft, the torque transferred to the crankshaft is therefore 6300*1.75" or 6300*0.146 foot or 920 foot-pounds of torque. At 135°, the volume will increase, but there will be 2520*sin(135) or 2520*0.707 or 1782 pounds which means the torque transferred to the crankshaft is 1782*0.146 foot or 260 foot-pounds. At 170°, 1638*sin (170) or 284 lbs and 284*0.146 or 41 foot-pounds of torque would be applied to the crankshaft. If ignition is delayed until 45° after TDC, then 650 foot-pounds is applied to the crankshaft at that position, 368 foot-pounds is applied at 90°, and 163 foot-pounds will be applied to the crankshaft at 135°.

Notice the same combustion process that occurs in a common internal combustion reciprocating-piston engine is made to occur in the engine known as the present invention at any angle past top-dead-center. That makes the calculations and plotting of the torque curves for various degrees of "firing" (or ignition) past top-dead-center relatively simple. Notice that even though a maximum torque of 920 ft-lbs of torque is applied to the crankshaft at 90° past top-dead-center, the torque-curve for that particular "firing" angle is too steep. However, the torque-curve depicting a 45° "firing" angle has the most area underneath and therefore has the maximum work done to rotate the crankshaft. This clearly demonstrates the mechanical advantage of using the engine and method known as the present invention in a vehicle in order to reduce fuel consumption. With more combustion energy converted to work, there will be much less waste-heat generated. Furthermore, combustion occurring in a somewhat constant-volume process as it occurs in the sidewall combustion chamber still gives the advantage of reduced pollution as claimed by Scuderi and Negre in their engines.

ADDITIONAL EMBODIMENTS

Another embodiment of the invention would consist of two cylinders where each cylinder contains a main piston and a displacer-piston where the compressed fuel-air mixture is forced through ports from either cylinder and by either piston into a single sidewall combustion chamber located adjacent to or in-between the two cylinders. The other main piston of the second cylinder, however, has moved downward in that cylinder enough to uncover and open the bottom cylinder port in that cylinder. The hot gases from combustion will then enter the second cylinder above the moving main piston. And of course, the displacer-piston in the second cylinder will at that point be locked into position above the opened bottom cylinder port. This combustion scenario allows the combustion method known to be the present invention to be accomplished with a single sidewall combustion chamber. The hot expanding gases of combustion are constantly directed from one top cylinder port of one cylinder to the opened bottom cylinder port of the other cylinder. In other words, the fuel-air mixtures that was compressed by the main piston in the first cylinder is passed to the single sidewall combustion chamber located between the cylinders where it is ignited and then passed to the second cylinder above the main piston of the second cylinder to drive the main piston of the second cylinder downward with great force. Use of a single sidewall combustion chamber eliminates the need to hold the compressed fuel-air mixture, whether it's ignited or not, for prolonged periods of time. Intake and exhaust valves in this scenario will probably have to be relocated from the sidewall combustion chamber.

The preferred embodiment of the present invention shown in this description uses gasoline as the fuel, but this engine can use hydrogen fuel as well. For that matter, burning hydrogen with air in an engine of this type has the potential to be more powerful and less polluting than any other hydrogen-burning engine which makes this invention superior to the Scuderi and Negre engines.

It should also be evident that an engine of this nature can work with any number of cylinders at any angle of inclination and with many different types of fuel other than gasoline and any other oxidizer besides air. If diesel is used as a fuel, the sparkplug will be replaced by a glowplug if necessary or the fuel will be ignited simply by being highly compressed into the sidewall combustion chamber, or any combination thereof.

It should also be evident the identical combustion process of a standard IC engine is merely moved "down" the cylinder per se in this invention, which means that any process now used in common IC engines to enhance or prolong the "burn" can be used in this engine. Those methods include swirling the fuel and air for better mixing, stratification of the fuel/air techniques, and homogeneous charge combustion ignition (HCCI). More importantly, it should also be evident to one skilled in the art that fuel can be injected at any appropriate time into the sidewall combustion chamber with fuel injectors. Such a method would eliminate the need to compress air and fuel together in order to prevent premature ignition when using fuels such as diesel fuels. Fuel can also be injected near the bottom port in the sidewall combustion chamber to compensate for the slow flame-speed of hydrogen because the flame will already be ahead of the main piston even before ignition occurs!

Any engine or method that incorporates a sidewall combustion chamber, as described herein, into the combustion process in combination with the use of a main piston in a cylinder and a second piston in the same cylinder that accompanies the main piston downward in the cylinder during the power-stroke of the engine's cycle will be construed by a person skilled in the art to be an embodiment or object of the present invention. A sidewall combustion chamber by description and definition is any chamber with a minimum of volume or space capable of temporarily holding compressed gas and fuel, before or after ignition, that is adjacent to, substantially abuts against, and extends down along the outside wall of a cylinder, and which includes an opening into that cylinder for receiving gas and/or fuel during a compression stroke of the engine and a second opening for sending ignited gas and fuel into the same cylinder during a power or expansion stroke of the engine.

The method of rigidly locking the displacer-piston into position above the bottom cylinder port has proven to be better than using multiple crankshafts as done in an opposed-piston engine. Use of a sidewall combustion chamber eliminates the requirement of moving a highly-compressed charge of fuel and air between opposed pistons in a common cylinder. For that matter, a means for actuating the displacer-piston in this engine would only have to move the mass of the displacer-piston which would obviously require a minimal amount of energy scavenged from the engine's output power. This makes the invention known as the present invention better than opposed piston engines because a minimum number of parts is required to obtain a much greater amount of output power and work.

Another possible embodiment of the present invention would be an internal combustion, reciprocating piston engine comprised of a free-floating main piston and no crankshaft where a spring or other method of storing mechanical energy is used to move the free-floating piston back-and-forth in a cylinder and in a cycle through all phases or strokes of a thermodynamic Otto engine or heat cycle. The energy stored in a fuel would then be converted each cycle directly into electric energy by using the moving free-floating piston in an electric generator configuration or the energy can also be stored as high pressure air or gas each cycle in a reservoir designed for that purpose by using the moving free-floating piston in an air-compressor configuration.

And finally, it should be evident the engine and method known as the present invention can operate on the two-stroke or four-stroke Otto cycle.

CONCLUSION, RAMIFICATIONS, AND SCOPE

Accordingly, the reader will see that the engine and associated combustion method of this invention is a welcome change and improvement in internal-combustion reciprocating-piston engines and associated methods. Improvements in efficiency and output power are the result of combining several aspects of other known engines together with new concepts and devices in order to form a simpler, lighter engine with fewer parts to operate closer to the theoretical Carnot efficiency for any internal combustion engine.

Furthermore, there exists the opportunity with this engine and associated method of the present invention to increase the theoretical Carnot efficiency of the engine. By igniting the fuel-air mixture contained inside the sidewall combustion chamber much earlier than needed, a longer and much hotter burn at a fairly constant volume will result before the main piston uncovers the bottom cylinder port, thus increasing the hot-side temperature and pressure in order to increase the overall Carnot efficiency. An increase in hot-side temperatures will result in a corresponding rise in working pressure which will become evident by an upward shifting of the torque-curves as shown for this engine, which means much more energy released during the combustion process is converted to useful work in rotating the crankshaft and driving the wheels of the vehicle. Furthermore, the present invention also has the following additional advantages in that it permits building lightweight, simpler engines at reduced cost which are also more efficient and more powerful;

it can provide a much-needed increase in miles traveled per gallon of fuel if used in an automotive application;

it allows powerful engines to be built that reduce pollution;

it permits more efficient use of non-renewable energy sources;

it can lessen our dependence on foreign oil and increase national security.

Although the description above contains many specificities, these should not be construed as limiting the scope of the invention but as merely providing illustrations of some of the preferred embodiments of this invention.

I claim:

1. A cyclic internal combustion engine comprising:
   a. a cylindrical chamber, and b. a main piston capable of moving in a reciprocating motion in said cylindrical chamber and where said main piston is connected to a crankshaft by a connecting rod, and
c. a second piston also capable of moving in a reciprocating motion in said cylindrical chamber mounted to act in opposition to, but able to follow said main piston for a distance in said cylindrical chamber so a combustion chamber with minimal volume can be temporarily made between the heads of said main piston and said second piston, and
d. a constant-volume combustion chamber separated from, but fluidly attached by a first channel to said cylindrical chamber at a first point for receiving a mixture of non-ignited fuel and air from said cylindrical chamber when said first channel is not closed, and where said constant-volume combustion chamber is also fluidly attached by a second channel at a second point to said cylindrical chamber for reintroducing a mixture of ignited fuel and air into temporary said combustion chamber made between said heads of moving said main piston and stationary said second piston in said cylindrical chamber when said second channel is not closed, and
e. means for opening or closing said first channel and said second channel, and
f. means for adding fuel to said cylindrical chamber or said constant-volume combustion chamber, and
g. means for moving and controlling said second piston as it moves in a reciprocating motion in said cylindrical chamber, and
h. means for intaking, adding, or drawing in air or other gases into said cylindrical chamber or said constant-volume combustion chamber, and
i. means for exhausting or forcing out burnt fuel and air or other gases from said cylindrical chamber or said constant-volume combustion chamber, and
j. means for igniting said mixture of fuel and air in said cylindrical chamber or said constant-volume combustion chamber, and
k. means for converting rotary motion of said crankshaft connected to said main piston by said connecting rod into useful work, whereby ignition of said mixture of fuel and air is delayed until said crankshaft and said connecting rod are at an optimum rotational angle or position for receiving and converting energy released from the combustion of said mixture of fuel and air into useful work.

2. The cyclic internal combustion engine in claim 1 wherein said means for igniting said compressed mixture of fuel and air is comprised of a sparkplug.

3. The cyclic internal combustion engine in claim 1 wherein said means for igniting said compressed mixture of fuel and air is comprised of a glow plug.

4. The cyclic internal combustion engine in claim 1 wherein said fuel is hydrogen.

5. The cyclic internal combustion engine in claim 1 wherein said fuel is diesel.

6. The cyclic internal combustion engine in claim 1 wherein said means for opening and closing said first channel and said second channel is comprised of a valve.

7. The cyclic internal combustion engine in claim 1 wherein said means for opening and closing said first channel and said second channel is comprised of a piston ring or the side skirt of a piston.

8. A cyclic heat engine comprising a first piston moving in a cylindrical chamber where said first piston compresses air into a constant-volume chamber through a first channel and a second channel where both said first channel and said second channel fluidly connect said constant-volume chamber to said cylindrical chamber and where said first channel and said second channel can be blocked when necessary so compressed said air can be temporarily stored and trapped in said constant-volume chamber while fuel is added to said compressed air and where a mixture of compressed said fuel and said air in said constant-volume combustion chamber is ignited and then subsequently injected into said cylindrical chamber from said constant-volume chamber through said second channel to an opening of said second channel located in said cylindrical chamber between the heads of moving said first piston and a second piston, which is moved by moving means in opposition to said first piston in said cylindrical chamber, but where said second piston is temporarily locked rigidly into position above said opening of said second channel in said cylindrical chamber in order to minimize the volume between the heads of said first piston and said second piston so that work can be done by said first piston when rotating a crankshaft connected to said first piston by a connecting rod, whereby ignition of said mixture of fuel and air is delayed until said crankshaft and said connecting rod are at an optimum rotational angle or position for receiving and converting energy released from the combustion of said mixture of fuel and air into useful work.

9. A method of energy conversion comprising:
a. providing a cyclic internal combustion engine comprising a cylindrical chamber, and a main piston capable of moving in a reciprocating motion in said cylindrical chamber and where said main piston is connected to a crankshaft by a connecting rod, and a second piston also capable of moving in a reciprocating motion in said cylindrical chamber mounted to act in opposition to said main piston, and a constant-volume combustion chamber separated from, but fluidly attached by a first channel and a second channel to said cylindrical chamber, and means for moving and controlling said second piston as it moves in a reciprocating motion in said cylindrical chamber, and means for adding or drawing in air or other gases into said cylindrical chamber or said constant-volume combustion chamber, and means for adding fuel to said cylindrical chamber or said constant-volume combustion chamber, and means for exhausting or forcing out burnt fuel and air or other gases from said cylindrical chamber or said constant-volume combustion chamber, and means for igniting said mixture of gases and fuel in said cylindrical chamber or said constant-volume combustion chamber, and means for closing said first channel and said second channel, and means for converting rotary motion of said crankshaft connected to said main piston by said connecting rod into useful work, then
b. beginning an operating cycle of provided said cyclic internal combustion engine by drawing in said fuel and air into said cylindrical chamber as said main piston is moved by said connecting rod connected to rotating said crankshaft where said air is added by said means for adding or drawing in said air or other gases into said cylindrical chamber and where said fuel is added by said means for adding fuel to said cylindrical chamber, then
c. compressing a mixture of said fuel and said air in said cylindrical chamber by said main piston moved by said connecting rod connected to said rotating crankshaft, then
d. forcing compressed said mixture of fuel and air into said constant-volume combustion chamber through said first channel and through said second channel from said cylindrical chamber with said main piston moved by said connecting rod connected to said rotating crankshaft, then
e. storing said mixture of compressed fuel and air in said constant-volume combustion chamber as said first channel is blocked by said second piston moving in said cylindrical chamber and as said second channel is blocked by said main piston moving in said cylindrical chamber, then
f. igniting said mixture of compressed fuel and air temporarily stored or trapped in said constant-volume combustion chamber with provided said means for igniting said mixture of gases and fuel in said constant-volume combustion chamber, while
g. moving said main piston with said connecting rod connected to said rotating crankshaft and also moving said second piston with provided said means for moving and controlling said second piston so that said second piston acts in opposition to said main piston and where said second piston follows said first piston in said cylindrical chamber until said second piston reaches the opening of said second channel in said cylindrical chamber where said second piston is rigidly locked into position while said connecting rod connected to said main piston is at an optimum angle or position for receiving forces from said main piston in order to rotate said crankshaft, then
h. allowing relatively high-pressure ignited said mixture of compressed fuel and air to enter said cylindrical chamber from said constant-volume combustion chamber through said second channel between moving said first piston and said stationary said second piston in said cylindrical chamber while said second channel is not blocked by said main piston and while said first channel is blocked by said second piston, then
i. rotating said crankshaft by applying a force from said main piston moving in said cylindrical chamber connected to said crankshaft by said connecting rod while said second piston is stationary and rigidly locked into position above said opening of said second channel in said cylindrical chamber, then
j. moving said second piston in said cylindrical chamber with said means for moving and controlling said secondary piston so volume of said cylindrical chamber between said second piston and said main piston is maximized and so said first channel is no longer blocked by said second piston, then
k. exhausting or forcing out burnt fuel and air or other gases from said cylindrical chamber and said constant-volume combustion chamber by moving said main piston in said cylindrical chamber with momentum of rotating said crankshaft connected to said main piston with said connecting rod and with provided said means for exhausting or forcing out burnt fuel and gases from said cylindrical chamber, thus completing an operating cycle of provided said cyclic internal combustion engine cycle, then
l. repeating said operating cycle of provided said cyclic internal combustion engine many times, whereby ignition of said mixture of fuel and air is delayed until said crankshaft and said connecting rod are at an optimum rotational angle or position for receiving and converting energy released from the combustion of said mixture of gases and fuel into useful work.

* * * * *